United States Patent

Ondetti et al.

[11] 3,723,406
[45] Mar. 27, 1973

[54] NORREL PEPTIDES HAVING CHOLECYSTORININ ACTIVITY AND INTERMEDIATES THEREFOR

[75] Inventors: Miguel A. Ondetti, North Brunswick; Josip Pluscec, East Brunswick; John T. Sheehan, Middlesex, all of N.J.; Johan E. Jorpes, Stockholm; Viktor Mutt, Farsta, both of Sweden

[73] Assignee: E. R. Squibb & Sons, Inc., New York, N.Y.

[22] Filed: Dec. 23, 1969

[21] Appl. No.: 889,768

Related U.S. Application Data

[62] Division of Ser. No. 726,558, May 3, 1968.

[52] U.S. Cl. ............................................. 260/112.5
[51] Int. Cl. ............................ C07c 103/52, C07g 7/00
[58] Field of Search .................................... 260/112.5

[56] References Cited

UNITED STATES PATENTS

| | | | |
|---|---|---|---|
| 3,579,494 | 5/1971 | Ondetti et al. | 260/112.5 |
| 3,472,832 | 10/1969 | Bernardi et al. | 260/112.5 |
| 3,296,243 | 1/1967 | Johl et al. | 260/112.5 |
| 3,250,760 | 5/1966 | Brenner | 260/112.5 |
| 3,400,118 | 9/1968 | Bodanszky et al. | 260/112.5 |
| 3,475,403 | 10/1969 | Mazur et al. | 260/112.5 |
| 3,488,726 | 1/1970 | Ondetti et al. | 260/112.5 |

OTHER PUBLICATIONS

Klieger, Experientia 24, 13–14 (1968). Fruton et al., J. Biol. Chem 127, 637 (1939).
Bodanszky et al., Peptide Synthesis, Interscience Publishers (John Wiley and Sons), New York (1966). pages 25–31, 45, 46, 51, 52 and 56–58.
Schroder et al., The Peptides, Vol. I, Academic Press, New York (1965). pages 64–67.
Bergmann et al., Chem. Ber. 65, 1200–1201 (1932).
Cuttmann, cited in Chem. Abst. 55, 23360–23366 (1961).

*Primary Examiner*—Elbert L. Roberts
*Attorney*—Lawrence S. Levinson and Merle L. Smith

[57] ABSTRACT

Novel peptides amides of the general formula

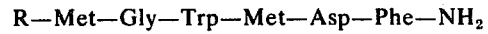

R—Met—Gly—Trp—Met—Asp—Phe—NH$_2$ wherein R represents L-aspartyl-O-sulfate-L-tyrosyl, L-aspartyl-L-arginyl-L-aspartyl-O-sulfate-L-tyrosyl, or isoleucyl-L-seryl-L-aspartyl-L-arginyl-L-aspartyl-O-sulfate-L-tyrosyl, and intermediates in the production thereof. The peptide amides of this invention as well as the pharmaceutically acceptable salts thereof have been found to possess cholecystokinin activity.

9 Claims, No Drawings

NOVEL PEPTIDES HAVING CHOLECYSTOKININ ACTIVITY AND INTERMEDIATES THEREFOR

The present application is a division of copending application Ser. No. 726,558 filed 3 May 1968.

This invention relates to novel peptide amides of the general formula

R—Met—Gly—Trp—Met—Asp—Phe—$NH_2$

Wherein R represents L-aspartyl-O-sulfate-L-tyrosyl, L-aspartyl-L-arginyl-L-aspartyl-O-sulfate-L-tyrosyl, or isoleucyl-L-seryl-L-aspartyl-L-arginyl-L-aspartyl-O-sulfate-L-tyrosyl, and to the intermediates and their salts employed in the preparation thereof.

Peptide salts encompassed by the above include, for instance, hydrochlorides, hydrobromides, acetates, fluoroacetates, such as trifluoroacetate, chloroacetates such as dichloroacetate, and the like, as well as ammonium salts such as dicyclohexylammonium, triethylammonium, morpholinium, pyridinium, and the like.

The final products of this invention are peptide amides containing amino acid residues of L-isoleucine (Ileu), L-serine (Ser), L-arginine (Arg), L-tyrosine (Tyr), L-aspartic acid (Asp), L-methionine (Met), glycine (Gly), L-tryptophane (Trp) and L-phenylalanine (Phe).

These products have been found to possess cholecystokinin activity. That is, they have the ability to stimulate the contraction of the gall bladder. Thus, they find utility as diagnostic aids in X-ray examination of the gall bladder in the same manner as cholecystokinin. For such purposes, they may be administered either intravenously or subcutaneously to an animal species (e.g., cats or dogs) in a single dosage of about 0.0002 to 0.0003 mg./kg. of body weight.

For this purpose they may be administered parenterally by incorporating the appropriate dosage of the compound with carriers to form injectables according to standard pharmaceutical practice.

Hydrazide intermediates for the compounds of the present invention include compounds of the formula R-$NHNH_2$ wherein R is N-protected L-aspartyl-L-tyrosyl, N-protected L-arginyl-L-aspartyl-L-tyrosyl, N-protected L-aspartyl-L-arginyl-L-aspartyl-L-tyrosyl or N-protected isoleucyl-L-seryl wherein the N-protecting group is benzyloxycarbonyl, t-butyloxycarbonyl, trifluoroacetyl or o-nitrophenylsulfenyl.

Protected hydrazide intermediates for the compounds of the present invention include compounds of the formula R-NHNH-Y wherein R is X-protected L-seryl, protected L-seryl, X-L-isoleucyl-O-protected L-seryl, X-protected L-arginyl-$\beta$-protected L-aspartyl-L-tyrosyl, nitro-L-arginyl-$\beta$-protected L-aspartyl-L-tyrosyl, X-protected L-aspartyl-nitro-L-arginyl-$\beta$-protected-L-aspartyl-L-tyrosyl, and acid-addition salts thereof; wherein X and Y are different amino protecting groups selected from the group consisting of benzyloxycarbonyl, t-butyloxycarbonyl, trifluoroacetyl and o-nitrophenylsulfenyl, provided that when one of X or Y is t-butyloxycarbonyl, the other protecting group is other than o-nitrophenylsulfenyl.

The compounds of this invention may be prepared in accordance with the following reaction schema wherein $B_z$ represents benzyl and X and Y are as hereinafter set forth:

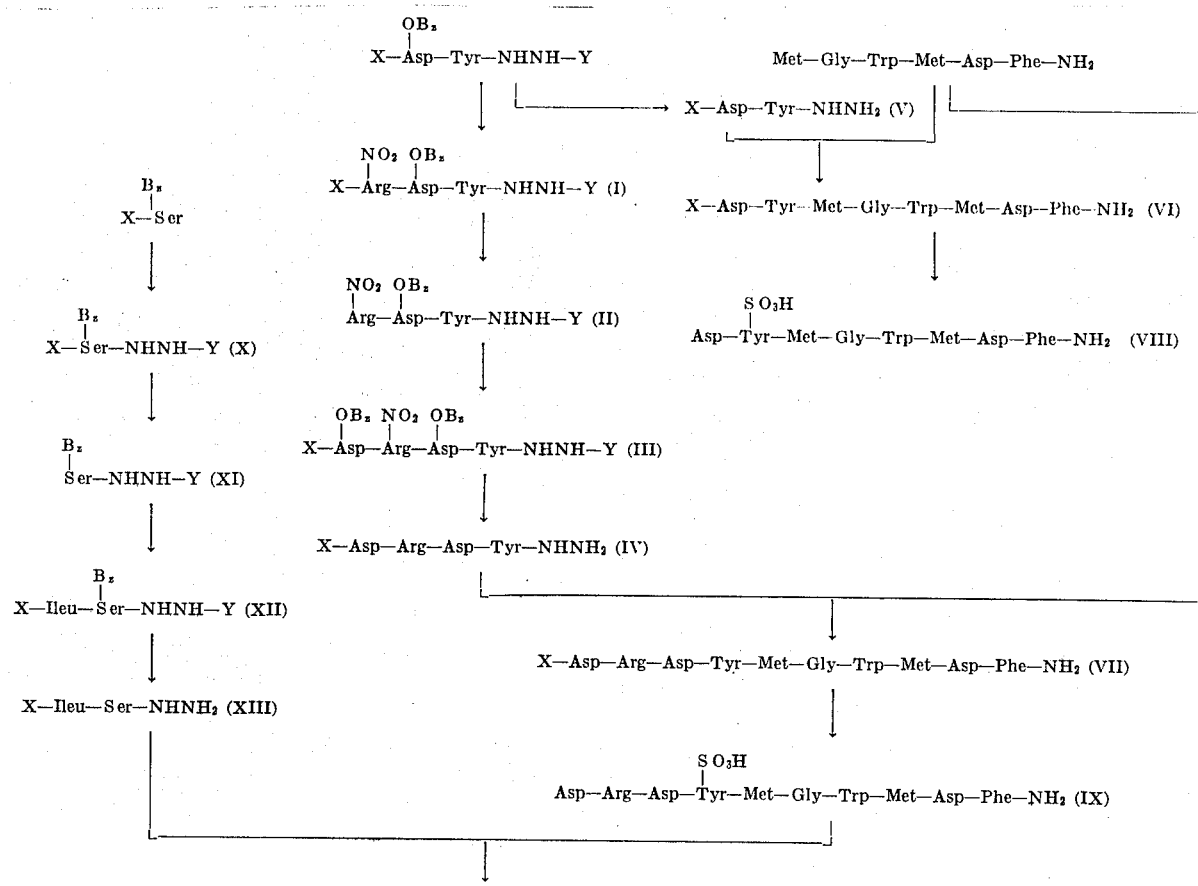

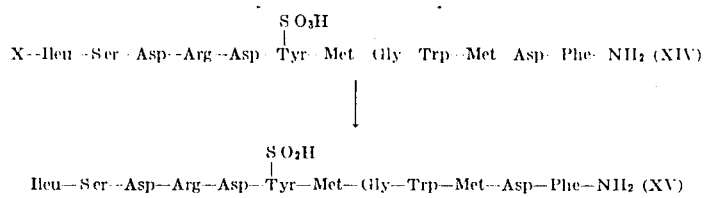

Two of the starting materials, namely, tertiary butyloxycarbonyl-O-benzyl-L-serine and tertiary butyloxycarbonyl-β-benzyl-L-aspartyl-tyrosine benzyloxycarbonyl-hydrazide are well known in the art. The starting material L-methionyl-glycyl-L-tryptophyl-L-methionyl-L-aspartyl-L-phenylalanine amide may be prepared by reacting glycyl-L-tryptophyl-L-methionyl-L-aspartyl-L-phenylalanine amide trifluoroacetate with tertiary butyloxycarbonyl-L-methionyl-2,4,5-trichlorophenyl ester. The peptide sequences indicated in the above reaction schema may be joined by any known coupling method of peptide synthesis to form the indicated polypeptides as shown. Partial sequences are first formed by joining together the amino acids one at a time and then joining the resulting sequences one with another to obtain the desired polypeptide product.

Alternatively, the peptides of this invention may be prepared by the sequential addition of the appropriate amino acids one at a time to the L-methionylglycyl-L-tryptophyl-L-methionyl-L-aspartyl-L-phenylalanine amide.

Such additions are accomplished, for example, by activating the carboxylic acid group in the amino acid to be added after protecting the amino group in such amino acid, for instance, by converting it to its tertiary-butyloxycarbonyl derivative, converting this derivative into, for example, a nitrophenyl ester and then interacting this active ester with another amino acid or peptide as desired.

Among the suitable activating groups to be employed in the above process may be mentioned any group which causes the acid function to become more reactive, such as mixed anhydrides, (which normally involves the acylation of an amine with the mixed anhydrides of, for instance, an acyl amino acid and isovaleric acid), azides, acid chlorides, reaction products with carbodiimides, reactive N-acyl compounds, O-acyl hydroxylamine derivatives, and active esters, such as alkyl esters with electron attracting (negative) substituents, vinyl esters, enol esters, phenyl esters, halophenyl esters, thiophenyl esters, nitrophenyl esters, 2,4-dinitrophenyl esters, and nitrophenylthiol esters.

In forming the peptide sequences in the above manner, the hydroxyl protecting group employed may be benzyl, tertiary butyl, tetrahydropyranyl, and the like, the carboxyl protecting groups may be methyl, ethyl, tertiary butyl, benzyl, and the like, the guanidino protecting groups may be nitro, tosyl, p-nitrobenzyloxycarbonyl, protonation, and the like, and the amino protecting groups (X and Y in the above formulas) may be benzyloxycarbonyl, t-butyloxycarbonyl, trifluoroacetyl or o-nitrophenylsulfenyl, except that t-butyloxycarbonyl may not be employed in combination with o-nitrophenylsulfenyl.

It should be noted at this point that since protecting group X in the above formula must be selectively removed in order to add the next amino acid in the sequence, it is required that X and Y be different.

Various methods of removing protecting groups X and Y from the peptide claim are known in the art. However, since selective removal of X is required, the method chosen will depend upon the protecting group employed. For instance, where X represents t-butyloxycarbonyl, it may be removed by acid treatment, as by trifluoroacetic acid, or the like. Where X represents benzyloxycarbonyl, the removal may be by hydrogenolysis, for instance, in the presence of a palladium on charcoal catalyst. In those instances where X represents trifluoroacetyl, it may be removed by treatment with a nucleophile (e.g., hydrazine in methanol, sodium hydroxide in methanol or an alkoxide such as sodium methoxide or sodium ethoxide, and the like). If X is o-nitrophenylsulfenyl, it may be removed either by treatment with mild acid [e.g., a hydrohaloacid (such as hydrobromic or hydrochloric acids) in a solvent such as ethyl acetate, ether, or other alkyl ester or alkyl ether solvents], or with a sulfur nucleophile, such as sodium thiophenoxide, nitrothiophenoxide, and the like. By proceeding in this manner, selective removal of the X protecting group is achieved. Selective removal of Y to form the protected peptide hydrazide intermediate may be accomplished in the same manner as set forth above, the appropriate method of removal being selected, dependent upon the protecting group employed.

The hydroxyl, carboxyl and guanidino protecting groups may be removed by known reactions, such as hydrogenolysis, treatment with acids such as hydrochloric acid, hydrobromic acid, trifluoroacetic acid, and the like, treatment with alkali, such as sodium or potassium hydroxide, and the like, or by treatment with sodium in liquid ammonia.

The sulfation of the peptides of this invention containing tyrosine may be achieved by the reaction of the peptide with concentrated sulfuric acid in the cold for a short period of time. We have discovered, however, that sulfation is greatly facilitated and a significant increase in yield of the desired peptide ester is obtained if potassium bisulfate is added to the concentrated sulfuric acid (for example, in a ratio of from about 5 to 20 moles of bisulfate to moles of peptide). The reaction is conducted for a period of time of about 3 to 8 hours at temperatures below 20°C, preferably below 0°C.

The invention will be further illustrated in the following examples. All temperatures are in degrees Centigrade unless otherwise stated:

Example 1

L-methionylglycl-L-tryptophyl-L-methionyl-L-aspartyl-L-phenylalanine amide

A. tert.-Butyloxycarbonyl-L-methionylglycyl-L-tryptophyl-L-methionyl-L-aspartyl-L-phenylalanine amide. Glycyl-L-tryptophyl-L-methionyl-L-aspartyl-L-phenylalanine amide trifluoroacetate (3.8 g.) is dissolved in a mixture of dimethylformamide (45 ml.) and triethylamine (1.4 ml.) and tert.-butyloxycarbonyl-L- methionine 2,4,5-trichlorophenyl ester (2.5 g.) added. After stirring for three hours at room temperature, the reaction mixture is diluted with ethyl acetate and the precipitate is filtered, washed with ethyl acetate and ether and dried. Yield is 3.4 g.; m.p. 180°–182°.

B. The protected hexapeptide of (A) (3.1 g.) is dissolved in cold trifluoroacetic acid (20 ml.) and the solution kept under nitrogen at room temperature for 25 minutes. Addition of ether (250 ml.) precipitates the trifluoroacetate which is filtered, washed with ether and dried.

Example 2 tert.-Butyloxycarbonylnitro-L-arginyl-β-benzyl-L-aspartyl-L-tyrosine benzyloxycarbonylhydrazide (I)

β-Benzyl-L-aspartyl-L-tyrosine benzyloxycarbonylhydrazide trifluoroacetate (1.25 g.) was dissolved in dimethylformamide (5 ml.) and the solution was cooled in an ice-bath. Triethylamine (0.28 ml.) and tert.-butyloxycarbonylnitro-L-arginine N-hydroxysuccinimide ester (915 mg.) were added. The reaction mixture was stored at room temperature and three more portions (83 mg. each) of active ester were added after 2, 3 and 6 hours. After a total reaction time of 24 hours, ethyl acetate (200 ml.) was added and the solution was washed with 20 percent aqueous citric acid and water. After drying (MgSO$_4$), the solvent was removed in vacuo and the residue crystallized from ethyl acetate ether. Yield 1.31 g.

Example 3

Nitro-L-arginyl-β-benzyl-L-aspartyl-L-tyrosine benzyloxycarbonyl-hydrazide trifluoroacetate (II)

I (1.11 g.) was dissolved in trifluoroacetic acid (7 ml.) and the solution was kept at room temperature for 15 minutes. The solvent was removed in vacuo and the residue was titurated with ether. Yield 1.04 g.

Example 4 tert.-Butyloxycarbonyl-β-benzyl-L-aspartyl-nitro-L-arginyl-β-benzyl-L-aspartyl-L-tyrosine benzyloxycarbonylhydrazide (III)

Triethylamine (0.17 ml.) was added to an ice-cold solution of II (1.04 g.) in dimethylformamide (5 ml.), followed by tert.-butyloxycarbonyl-β-benzyl-L-aspartic acid p-nitrophenyl ester (650 mg.). After 3 hours standing at room temperature, the mixture was diluted with ethyl acetate (100 ml.) and the solution was washed with 20 percent aqueous citric acid and water. After drying (MgSO$_4$) the solvent was removed in vacuo and the residue triturated with a mixture of ethyl acetate-hexane. Yield 1.08 g.

Example 5 tert.-Butyloxycarbonyl-L-aspartyl-L-arginyl-L-aspartyl-L-tyrosine hydrazide (IV)

A solution of III (900 mg.) in a mixture of methanol, acetic acid, water (2:1:1) was hydrogenated for 24 hours over 10 percent palladium on charcoal (150 mg.). The catalyst was filtered and the filtrate was concentrated to dryness. The residue was disintegrated with ethanol and filtered. Yield 402 mg.

Example 6 tert.-Butyloxycarbonyl-L-aspartyl-L-tyrosine hydrazide (V)

A solution of tert.-butyloxycarbonyl-β-benzyl-L-aspartyl-L-tyrosine benzyloxycarbonylhydrazide (5 g.) in a mixture of methanol, acetic acid and water (2:1:1) was hydrogenated for 4.5 hours over 10 percent palladium on charcoal (800 mg.). The catalyst was filtered and the filtrate was concentrated to dryness in vacuo. The residue was triturated with ethyl acetate. Yield 3.1 g.

Example 7 tert.-Butyloxycarbonyl-L-aspartyl-L-tyrosyl-L-methionylglycyl-L-tryptophyl-L-methionyl-L-aspartyl-L-phenylalanine amide (VI)

Concentrated hydrochloric acid (0.12 ml.) was added to a solution of V (100 mg.) in dimethylformamide (4 ml.), cooled in a dry ice-acetone bath at −20°. The temperature of the bath was allowed to rise to −15° and an aqueous 14 percent sodium nitrite solution (0.125 ml.) was added. After 5 minutes the temperature of the bath was lowered to −25° and N-ethylpiperidine (0.26 ml.) was added, followed by 180 mg. of L-methionyl-glycyl-L-tryptophyl-L-methionyl-L-aspartyl-L-phenylalanine amide trifluoroacetate dissolved in dimethylformamide (1 ml.). The reaction mixture was stored at 5° and after 24 hours a second portion of tert.-butyloxycarbonyl-L-aspartyl-L-tyrosine azide (from 40 mg. of V) was added. After another 24-hour period at 5°, the reaction mixture was poured into 30 ml. of water containing 1 percent acetic acid. The precipitate was dried. Yield 200 mg.

Example 8 tert.-Butyloxycarbonyl-L-aspartyl-L-arginyl-L-aspartyl-L-tyrosyl-L-methionyl-glycyl-L-tryptophyl-L-methionyl-L-aspartyl-L-phenylalanine amide (VII)

Concentrated hydrochloric acid (0.12 ml.) was added to a solution of IV (170 mg.) in dimethylformamide (1.2 ml.) and cooled in a dry ice-acetone bath at −20°. The temperature of the bath was allowed to rise to −15° and an aqueous 14 percent sodium nitrite solution (0.125 ml.) was added. After 5 minutes the temperature of the bath was lowered to −25° and N-ethylpiperidine (0.26 ml.) was added, followed by 180 mg. of L-methionyl-glycyl-L-tryptophyl-L-methionyl-L-aspartyl-L-phenylalanine amide dissolved in dimethylformamide (1 ml.). The reaction mixture was stored at 5° for 24 hours and a second portion of the tetrapeptide azide (from 68 mg. of IV) was added. After 24 hours the reaction was poured into 30 ml. of water. The precipitate was filtered and dried. Yield 250 mg.

Example 9

L-Aspartyl-O-sulfate-L-tyrosyl-L-methionyl-glycyl-L-tryptophyl-L-methionyl-L-phenylalanine amide (VIII)

A. A solution of VI (320 mg.) in trifluoroacetic acid (7 ml.) was kept under nitrogen at room temperature for 15 minutes. Ether (100 ml.) was added and the precipitate filtered, washed thoroughly with ether and dried. This material (280 mg.) was added to concentrated sulfuric acid (20 ml.), cooled at −20°. The solution was kept in the dry ice-acetone bath at −20° for 75 minutes. The sulfuric acid solution was poured into ice-water (80 ml.). The precipitate was centrifuged, resuspended in ice-water (30 ml.) and 4N sodium hydroxide was added until a clear solution was obtained. After reacidification to pH 4 with dilute sulfuric acid, the precipitate formed was centrifuged, washed twice with ice-water and dried. Yield 155 mg. Chromatography on DEAE Sephadex (with ammonium carbonate buffer) yielded the desired octapeptide sulfate ester: 30 mg.

B. A solution of VI (330 mg.) in trifluoroacetic acid (7 ml.) was kept under nitrogen at room temperature for 15 minutes. Ether (100 ml.) was added and the precipitate was filtered, washed thoroughly with ether and dried. This material (300 mg.) was added in portions to concentrated sulfuric acid (18 ml.) cooled at −20° with vigorous stirring. After 15 minutes a solution of potassium bisulfate in concentrated sulfuric acid (408 mg. in 3 ml.) was added. The reaction mixture was stirred for 75 minutes at −15° and then stored at −7° for 285 minutes. The sulfuric acid solution was poured into cold ether (400 ml.); precipitate was filtered, washed with cold ether, and suspended in cold water. Complete solution was then achieved by careful addition of 2N sodium hydroxide. Acidification with N hydrochloric acid led to the precipitation of the desired octapeptide sulfate ester. Yield 200 mg.

Example 10

Aspartyl-L-arginyl-L-aspartyl-O-sulfate-L-tyrosyl-L-methionyl-glycyl-tryptophyl-L-methionyl-L-aspartyl-L-phenylalanine amide (IX)

A. A solution of VII (250 mg.) in trifluoroacetic acid (6 ml.) was kept at room temperature under nitrogen for 15 minutes. Ether (100 ml.) was added and the precipitate was centrifuged and washed with ether. Yield 212 mg. This material was dissolved in concentrated sulfuric acid (20 ml.) which had been pre-cooled in a dry ice-acetone bath at −20°. After one hour standing in the cooling bath, the sulfuric acid solution was poured into ice-water (100 ml.) and the precipitate formed was separated by centrifugation, and redissolved in water (30 ml.) by careful addition of a 4N sodium hydroxide. After acidification to pH 5 with dilute sulfuric acid, the precipitate was separated by centrifugation, washed with water and dried. Yield 150 mg. The desired decapeptide sulfate ester was isolated by chromatography on DEAE Sephadex (with ammonium carbonate buffer). Yield 32 mg.

B. Following the procedure of Example 9 B), but substituting an equivalent amount of compound VII for the compound VI therein employed, there is obtained the desired decapeptide sulfate in good yield.

Example 11 tert.-butyloxycarbonyl-O-benzyl-L-serine benzyloxycarbonylhydrazide (X)

A solution of tert.-butyloxycarbonyl-O-benzyl-L-serine (3 g.) and benzyloxycarbonylhydrazine (1.7 g.) in dichloromethane (20 ml.) was cooled in an ice-water bath. Dicyclohexylcarbodiimide (2.06 g.) was added and the mixture was stirred 2 hr. in the cold bath and 4 hr. at room temperature. The precipitate formed was filtered and the filtrate was washed with 20 percent citric acid, water, saturated sodium bicarbonate and water. After drying (MgSO$_4$) the solvent was removed in vacuo to yield an oily residue: 4.3 g.

Example 12

O-Benzyl-L-serine-benzyloxycarbonylhydrazide trifluoroacetate (XI)

A solution of X (4.3 g.) in trifluoroacetic acid (20 ml.) was kept at room temperature for 15 minutes. The trifluoroacetic acid was removed in vacuo and the residue was crystallized from ether-hexane. Yield 3.9 g.

Example 13 tert.-Butyloxycarbonyl-L-isoleucyl-O-benzyl-L-serinebenzyloxycarbonylhydrazide (XII)

Triethylamine (1.4 ml.) was added to an ice-cold solution of XI (4.5 g.) in dimethylformamide (20 ml.), followed by tert.-butyloxycarbonyl-L-isoleucine N-hydroxysuccinimide ester (4.18 g.). The reaction mixture was kept for 6 hours at room temperature and diluted with ethyl acetate (200 ml.). This solution was washed with 20 percent citric acid, water, saturated sodium bicarbonate and water. After drying (MgSO$_4$) the solvent was removed in vacuo and the residue was recrystallized from ether-hexane. Yield 5.2 g.

Example 14 tert.-Butyloxycarbonyl-L-isoleucyl-L-serine hydrazide (XIII)

A solution of XII (2.8 g.) in a mixture of methanol, acetic acid and water (2:1:1) was hydrogenated for 6 hours over palladium on charcoal (280 mg.). The catalyst was filtered, the filtrate was concentrated to dryness and the residue was crystallized from ether. Yield 1.5 g.

Example 15

L-isoleucyl-L-seryl-L-aspartyl-L-arginyl-L-aspartyl-O-sulfate-L-tyrosyl-L-methionyl-glycyl-L-tryptophyl-L-methionyl-L-aspartyl-L-phenylalanine amide (XV)

Concentrated hydrochloric acid (0.24 ml.) was added to a solution of XIII (170 mg.) in dimethylformamide (1 ml.) cooled in a dry ice-acetone bath at −20°. The temperature of the bath was allowed to rise to −15° and an aqueous 14 percent solution of sodium nitrite (0.25 ml.) was added. After 5 minutes the temperature was lowered to −25° and N-ethylpiperidine (0.6 ml.) was added, followed by a solution of IX (500 mg.) in dimethylformamide (2 ml.). After 24 hours standing at 5°, the reaction mixture was concentrated to dryness and the residue (XIV) dissolved in trifluoroacetic acid (3 ml.). The solution was kept under nitrogen at room temperature for 15 minutes. Ether was added and the precipitate was filtered and washed thoroughly with ether. Chromatography on DEAE Sephadex (ammonium carbonate buffer) yielded the desired dodecapeptide sulfate ester: 300 mg.

Example 16 tert.-Butyloxycarbonyl-L-arginyl-L-aspartyl-L-tyrosine hydrazide (XVI)

A solution of I (300 mg.) in a mixture of methanol-acetic acid-water (2:1:1) was hydrogenated for 24 hours over 10 percent palladium on charcoal (50 mg.). The catalyst was filtered and the filtrate was concentrated to dryness. The residue was disintegrated with ethyl acetate and filtered. Yield 150 mg.

Example 17 tert.-Butyloxycarbonyl-L-arginyl-L-aspartyl-L-tyrosyl-L-methionyl-glycyl-L-tryptophyl-L-methionyl-L-aspartyl-L-phenylalanine amide (XVII)

Concentrated hydrochloric acid (0.12 ml.) was added to a solution of XVI (138 mg.) in dimethylformamide (1.2 ml.) and cooled in a dry ice-acetone bath at −20°. The temperature of the bath was allowed to rise to −15° and an aqueous 14 percent sodium nitrite solution (0.125 ml.) was added. After 5 minutes the temperature of the bath was lowered to −25° and N-ethylpiperidine (0.26 ml.) was added, followed by 180 mg. of L-methionyl-glycyl-L-tryptophyl-L-methionyl-L-aspartyl-L-phenylalamine amide dissolved in dimethylformamide (1 ml.). The reaction mixture was stored at 5° for 24 hours and a second portion of the tetrapeptide azide (from 51 mg. of XV) was added. After 24 hours the reaction was poured into 30 ml. of water. The precipitate was filtered and dried. Yield 235 mg.

Example 18

L-Arginyl-L-aspartyl-O-sulfate-L-tyrosyl-L-methionyl-glycyl-L-tryptophyl-L-methionyl-L-aspartyl-L-phenylalanine amide (XVIII)

Following the procedure of Example 9, but substituting 235 mg. of XVII for VI, there is obtained the above. Yield 140 mg.

Example 19 tert.-Butyloxycarbonyl-L-seryl-L-aspartyl-L-arginyl-L-aspartyl-O-sulfate-L-tyrosyl-L-methionyl-glycyl-L-tryptophyl-L-methionyl-L-aspartyl-L-phenylalanine amide (XIX)

Concentrated hydrochloric acid (0.24 ml.) was added to a solution of tert.-butyloxycarbonyl-L-serine hydrazide (115 mg.) in dimethylformamide (1 ml.) cooled in a dry ice-acetone bath at −20°. The temperature of the bath was allowed to rise to −15° and an aqueous 14 percent solution of sodium nitrite (0.25 ml.) was added. After 5 minutes the temperature was lowered to −25° and N-ethylpiperidine (0.6 ml.) was added, followed by a solution of IX (500 mg.) in dimethylformamide (2 ml.). After 24 hours standing at 5° the reaction mixture was concentrated to dryness and the residue was triturated with water and then filtered and washed with ethanol. Yield 290 mg.

Example 20

Seryl-L-aspartyl-L-arginyl-L-aspartyl-O-sulfate-L-tyrosyl-L-methionyl-glycyl-L-tryptophyl-L-methionyl-L-aspartyl-L-phenylalanine amide XIX (290 mg.) was dissolved in trifluoroacetic acid (3 ml.) and the solution was kept at room temperature under nitrogen for 15 minutes. Ether was added (100 ml.) and the precipitate was filtered, washed with ether and dried. Chromatography on DEAE Sephadex yielded the desired hendecapeptide sulfate ester. Yield 200 mg.

Example 21

O-Sulfate-L-tyrosyl-L-methionyl-glycyl-L-tryptophyl-L-methionyl-L-aspartyl-L-phenylalanine amide.

Following the procedure of Example 9, but substituting an equivalent amount of L-tyrosyl-L-methionyl-glycyl-L-tryptophyl-L-methionyl-L-aspartyl-L-phenylalanine amide for VI, there is prepared the above.

The invention may be variously otherwise embodied within the scope of the appended claims.

We claim:

1. A compound of the formula $$R-NHNH_2$$

wherein R is or N-protected L-aspartyl-L-arginyl-L-aspartyl-L-tyrosyl, wherein the N-protecting group is benzyloxycarbonyl, t-butyloxycarbonyl, trifluoroacetyl or o-nitrophenylsulfenyl.

2. A compound according to claim 1 of the formula $$R-NHNH_2$$

wherein R is N-protected-L-arginyl-L-aspartyl-L-tyrosyl or N-protected L-arginyl-L-aspartyl-L-tyrosyl wherein the N-protecting group is benzyloxycarbonyl, t-butyloxycarbonyl, trifluoroacetyl or X-nitrophenylsulfenyl.

3. A compound in accordance with claim 2 having the name tert.-butyloxycarbonyl-L-aspartyl-L-arginyl-L-aspartyl-L-tyrosine hydrazide.

4. A compound in accordance with claim 2 having the name tert.-butyloxycarbonyl-L-arginyl-L-aspartyl-L-tyrosine hydrazide.

5. A hydrazide having the formula $$R-NHNH-Y$$

wherein R is X-protected nitro-L-arginyl-β-protected L-aspartyl-L-tyrosyl, nitro-L-arginyl-β-protected L-aspartyl-L-tyrosyl, or X-protected-β-benzyl-L-aspartyl-nitro-L-arginyl-β-protected L-aspartyl-L-tyrosyl, and acid-addition salts thereof; and wherein X and Y are different amino protecting groups selected from the group consisting of benzyloxycarbonyl, t-butyloxycarbonyl, trifluoroacetyl and o-nitrophenylsulfenyl, provided that when one of X or Y is t-butyloxycarbonyl, the other protecting group is other than o-nitrophenylsulfenyl, the hydroxyl protecting group being benzyl, tert.-butyl or tetrahydropyranyl, and the β-carboxyl protecting group being benzyl or lower alkyl.

6. A hydrazide according to claim 5 having the formula $$R-NHNH-Y$$

wherein R is X-protected nitro-L-arginyl-β-protected L-aspartyl-L-tyrosyl, nitro-L-arginyl-β-protected L-aspartyl-L-tyrosyl, or X-protected-β-benzyl-L-aspartyl-nitro-L-arginyl-β-protected L-aspartyl-L-tyrosyl, and acid-addition salts thereof; and wherein X and Y are different amino protecting groups selected from the group consisting of benzyloxycarbonyl, t-butyloxycarbonyl, trifluoroacetyl and o-nitrophenylsulfenyl, provided that when one of X or Y is t-butyloxycarbonyl, the other protecting group is other than o-nitrophenylsulfenyl, and wherein the β-carboxyl protecting group is benzyl or lower alkyl.

7. A compound in accordance with claim 6 having the name tert.-butyloxycarbonylnitro-L-arginyl-β-benzyl-L-aspartyl-L-tyrosine benzyloxycarbonylhydrazide.

8. A compound in accordance with claim 6 having the name nitro-L-arginyl-β-benzyl-L-aspartyl-L-tyrosine benzyloxycarbonylhydrazide trifluoroacetate.

9. A compound in accordance with claim 5 having the name tert.-butyloxycarbonyl-β-benzyl-L-aspartyl-nitro-L-arginyl-β-benzyl-L-aspartyl-L-tyrosine benzyloxycarbonylhydrazide.

* * * * *